July 7, 1959  J. M. HEGARTY ET AL  2,894,176
LOAD PROTECTION CIRCUITS OR THE LIKE
Filed Nov. 4, 1954  3 Sheets-Sheet 1
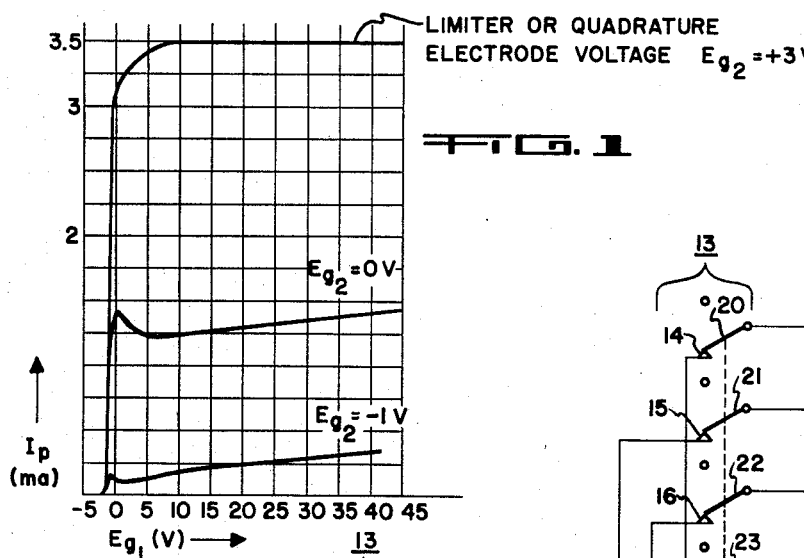
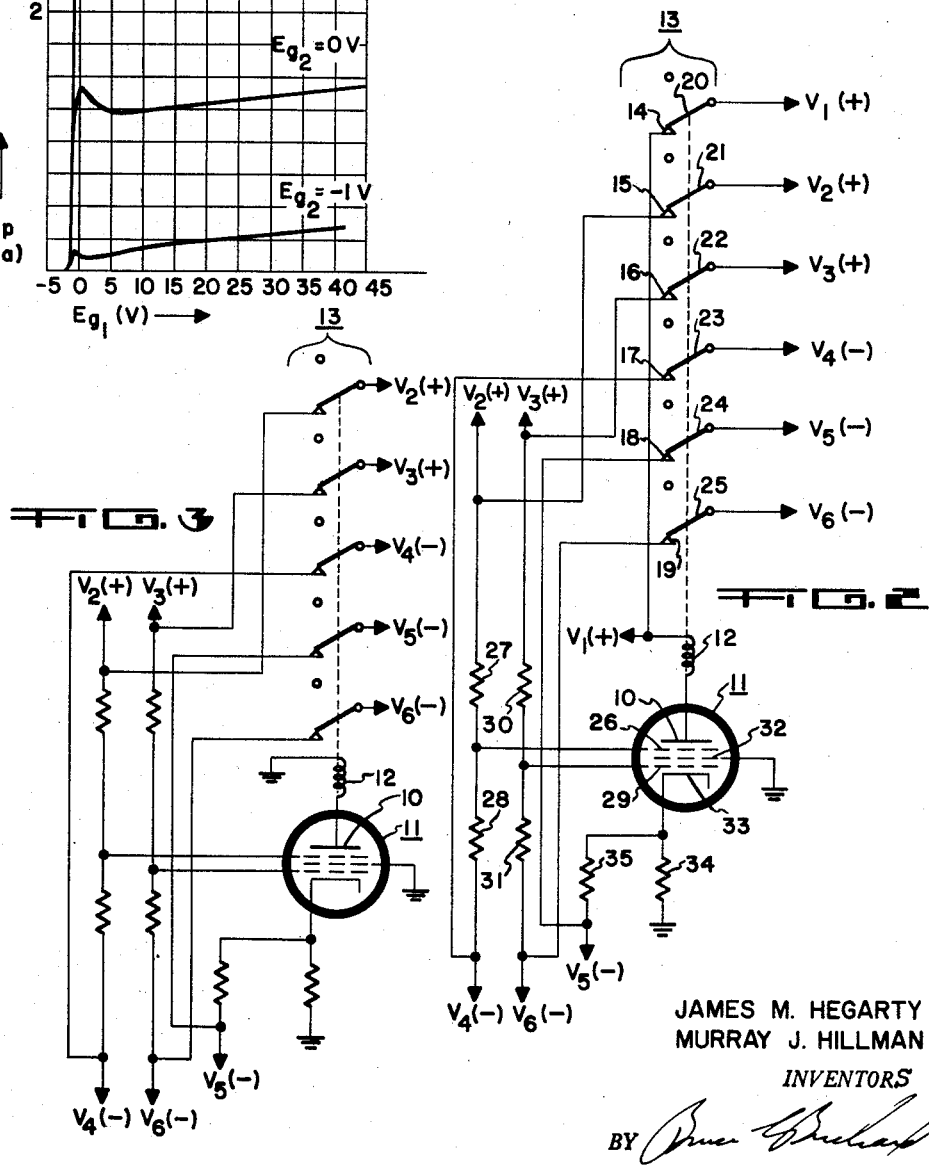
JAMES M. HEGARTY
MURRAY J. HILLMAN
*INVENTORS*
BY
THEIR ATTORNEY

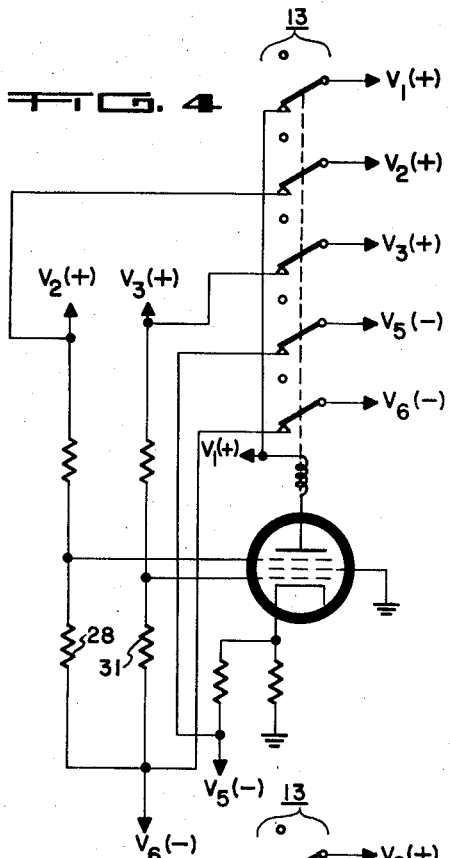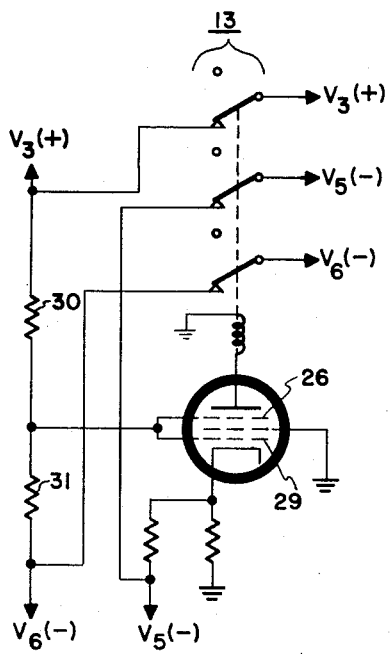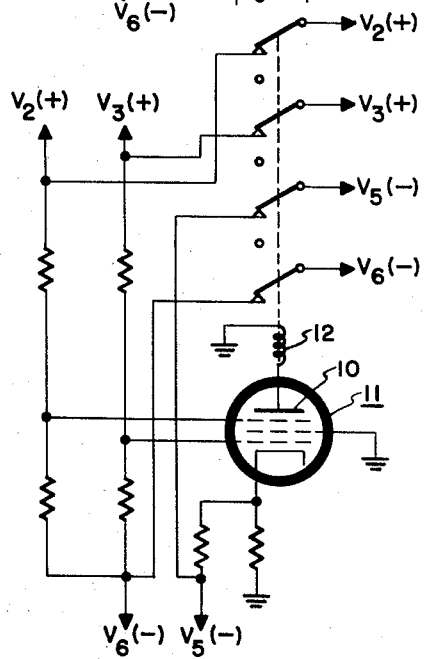

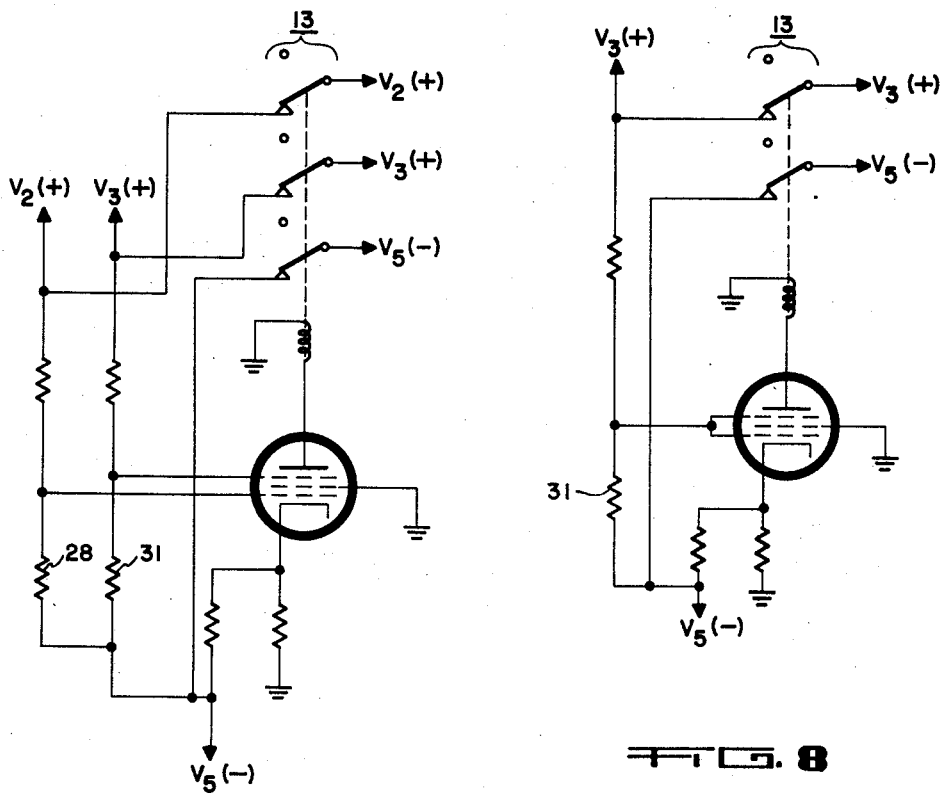

United States Patent Office 2,894,176
Patented July 7, 1959

2,894,176

LOAD PROTECTION CIRCUITS OR THE LIKE

James M. Hegarty, Alhambra, and Murray J. Hillman, San Gabriel, Calif., assignors to Hoffman Electronics Corporation, a corporation of California Application November 4, 1954, Serial No. 466,712

8 Claims. (Cl. 317—46)

This invention is related to circuits and devices which separate a load from its associated power supply in the event one or more of the power supply voltages fail, and more particularly, to an improved load protection circuit which exhibits optimum performance and is relatively simple and inexpensive to manufacture in comparison to multi-relay circuits currently employed as protection devices in systems where the use of over-load fuses is undesired.

In the past, a multitude of devices and circuits have been devised in the electronic industry to protect loads from a voltage failure in their associated power supply. To summarize very briefly the consequences upon load vacuum tubes in the event of a power supply voltage failure, it is recalled that: (1) failure in bias voltage may result in excessive anode current and consequential tube damage, (2) failure in anode voltage may cause excessive current to flow in the screen circuit of an affected vacuum tube, (3) failure in screen voltage supply will unquestionably result in a reduced quality of operation of the affected tube stage, and (4) failure in filament voltage in the case of high anode voltage vacuum tubes may result in deterioration of the emitter surface of the vacuum tube affected, owing to high field emission. Over-load fuses are, of course, the most common protective device employed in load circuits to prevent excessive current flow. In some instances the employment of a multiplicity of fuses in the load circuitry may be undesirous, both from the standpoint of replacement and also from the standpoint of physical accessibility. In addition, fuses will serve no useful purpose to protect against high field emission in the case of high voltage transmitter tubes, for example, owing to a failure of filament supply voltage. As a result of the necessarily limited application of over-load fuses, there have been developed in the recent past several types of multi-relay circuits for the accomplishment of load separation from its power supply in the presence of a power supply voltage failure. It would, of course, be desirous to have a load protection control circuit which is confined to a single stage and which incorporates in its design but a single relay.

Therefore, it is an object of this invention to provide a new and useful load protection circuit.

It is a further object of the present invention to provide a new useful load protection circuit which incorporates but a single relay control device, and which is confined in design to a single stage.

According to th present invention, a 6BN6-type vacuum tube exhibiting a step-shaped transfer characteristic has its anode electrode coupled to one end-terminal of a relay solenoid, the remaining solenoid end-terminal being maintained at the appropriate potential. The relay of which this solenoid forms a part has a plurality of "energized condition" contacts, each contact being coupled to one of a plurality of power supply voltages, and, in addition, to a plurality of switching arms associated with said contact plurality, each arm being adapted for coupling to the appropriate load voltage terminals. The aforementioned voltage plurality is also coupled through a particular type of voltage divider network in such a manner that the 6BN6 vacuum tube will change from its conducting state to its non-conducting state upon any appreciable change in any one of the aforementioned power supply voltages, thereby de-energizing the aforementioned relay so as to remove the power supply voltages from the load. The present invention is particularly suitable for employment in circuits in which possible circuit abnormalities are restricted in their effect to variation of operating voltages in a negative direction, whether such voltages be positive or negative.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1 is a representation of the transfer characteristic curves of a 6BN6-type vacuum tube.

Figure 2 is a schematic diagram of the present invention which is adapted to be used in conjunction with a power supply having three positive output voltages and three negative output voltages.

Figure 3 is a schematic diagram of the present invention which is adapted to be used in conjunction with a power supply having two positive output voltages and three negative output voltages.

Figure 4 is a schematic diagram of the present invention which is adapted to be used in conjunction with a power supply having three positive output voltages and two negative output voltages.

Figure 5 is a schematic diagram of the present invention which is adapted to be used in conjunction with a power supply having two positive output voltages and two negative output voltages.

Figure 6 is a schematic diagram of the present invention which is adapted to be used in conjunction with a power supply having one positive output voltage and two negative output voltages.

Figure 7 is a schematic diagram of the present invention which is adapted to be used in conjunction with a power supply having two positive output voltages and one negative output voltage.

Figure 8 is a schematic diagram of the present invention which is adapted to be used in conjunction with a power supply having one positive output voltage and one negative output voltage.

The transfer characteristic curves of a 6BN6-type vacuum tube as shown in Figure 1 illustrate the fact that due to the employment of a sharply focused electron beam, either control electrode will exhibit a step-shaped characteristic, the anode current rising abruptly from zero to a sharply defined maximum as the control electrode voltage changes from a slightly negative potential to a slightly positive potential. By definition the first control electrode of a 6BN6-type tube is termed the "limiter" electrode, the second control electrode is termed the "quadrature" electrode, and the intermediate electrode is termed the "accelerator" electrode. A unique feature of this particular type of vacuum tube is that either the limiter electrode or the quadrature electrode will exhibit the same step-shaped transfer characteristic. The graph shown in Figure 1 illustrates the transfer characteristic curves for the remaining grid ($g_2$) when at a potential of +3 volts, 0 volts, and −1 volt. From the graph it is seen that if $E_{g_2}$ is maintained at −1 volt, then anode current will rise from zero to its maximum within the increment of perhaps 1½ volts applied to control grid ($g_1$). If $E_{g_2}$ is maintained at 0 volts, anode current will rise from zero to its maximum during the increment of about 2½ volts applied to $g_1$. And finally, if $E_{g_2}$ is maintained at +3 volts, anode current will rise from zero to its maximum during the increment of approximately 12½ volts applied to $g_1$. It is accordingly seen from the diagram of Figure 1 that but a very few volts are required to change the state of the 6BN6 vacuum tube from a condition of maximum conduction to a non-conductive condition. As shall be demonstrated presently, it is this feature of the 6BN6 tube which is utilized by the several embodiments of the present invention which follow.

In Figure 2, anode 10 of vacuum tube 11 is coupled through solenoid 12, of relay 13, to a first source of positive voltage ($V_1$) which is supplied by the associated power supply (not shown). "Energized condition" contacts 14, 15, 16, 17, 18 and 19 are coupled to voltage sources $V_1$, $V_2$, $V_3$, $V_4$, $V_5$ and $V_6$, respectively. Switching arms 20, 21, 22, 23, 24 and 25, of relay 13, are adapted for coupling to the load to supply voltages, $V_1$, $V_2$, $V_3$, $V_4$, $V_5$ and $V_6$, respectively. Quadrature electrode 26 of vacuum tube 11 is coupled to the junction of series-connected resistors 27 and 28, the remaining end-terminals of which are coupled to positive voltage source $V_2$ and negative voltage source $V_4$, respectively, all voltage sources shown being derived from an associated power supply (not shown). Limiter electrode 29 of vacuum tube 11 is coupled to the junction of series-connected resistors 30 and 31, their remaining end-terminals being coupled to positive voltage source $V_3$ and negative voltage source $V_6$, respectively. Accelerator electrode 32 is directly coupled to ground. Cathode 33 of vacuum tube 11 is coupled to ground through resistor 34, and also to negative voltage source $V_5$ through resistor 35.

The circuit shown in Figure 2 operates as follows. It is assumed that the chosen values of the circuit parameters and the various voltage values are such as to permit tube conduction by vacuum tube 11, and consequential energization of relay 13, so that voltages $V_1$, $V_2$, $V_3$, $V_4$, $V_5$ and $V_6$ are ordinarily supplied to the adjacent load (not shown). Then, by virtue of the transfer characteristic of vacuum tube 11, should voltages $V_1$, $V_2$, $V_3$ or $V_5$ be reduced in magnitude to even perhaps one-third or one-fourth of their usual operating voltage values, vacuum tube 11 will be cut off and, consequently, relay 13 will be de-energized so as to remove the several voltages from the load. The above may readily be seen to be true for should any of the above enumerated voltages reduce in value, then, either quadrature electrode 26, limiter electrode 29, or anode 10 will be reduced in potential so as to effect a tube current cut-off. If negative voltage $V_5$ fails, then the anode characteristic of tube 11 will be relied upon and a substantial drop in either anode voltage $V_1$ or a decrease in the magnitude of the negative potential $V_5$ will be sufficient to bring vacuum tube 11 to non-conduction. A somewhat different situation is presented by negative voltages $V_4$ and $V_6$ from the associated power supply. The restriction which these voltages present through this invention is that they must be dependable and be regulated by appropriate VR tubes so that, in the event of VR tube failure, voltages $V_4$ and $V_6$ will increase negatively in value, thereby cutting off vacuum tube 11. Hence, in the case of negative voltages $V_4$ and $V_6$, the present invention will serve to warn of VR tube failures in that, in the event of such failures, vacuum tube 11 will reach a state of non-conduction and the several voltages applied to the load through relay 13 will be removed from the load thereby.

In practice, however, this invention is adapted to systems in which a lesser number of supply voltages is involved, as is shown in the following several embodiments.

The circuit shown in Figure 3 is the same as the circuitry of Figure 2 with the exception that voltage $V_1$ and relay switching arm 20 and contact 14, of relay 13, are shown removed. In addition, anode 10 of vacuum tube 11 is shown to be grounded through solenoid 12 of relay 13.

Except for voltage $V_1$ and its application to anode 10 of vacuum tube 11 and also to the load through relay 13, the operation of the circuit shown in Figure 3 is identical to that described with reference to Figure 2.

The circuit shown in Figure 4 is identical to that shown in Figure 2, with the exception that negative voltage $V_4$ and its associated switching arm 23 and contact 17, of relay 13, are shown removed. In addition, the remaining end-terminal of resistor 28 is coupled to negative voltage $V_6$ together with the remaining end-terminal of resistor 31.

The circuit shown in Figure 4 operates in an identical manner as that shown in Figure 2, ignoring negative voltage $V_4$ and its associated contact and switching arm of relay 13.

The circuit of Figure 5 is identical to that shown in Figure 4, with the exception that voltage $V_1$ is removed, as is also its associated switching arm 20 and contact 14 of relay 13. In addition, anode 10 of vacuum tube 11 is coupled through solenoid 12 to ground, instead of to voltage $V_1$.

The circuit shown in Figure 5 operates in a manner which is identical to the operation of the circuit shown in Figure 4, ignoring voltage $V_1$ and contact 14 and switching arm 20 which are associated therewith.

The circuit of Figure 6 is identical to that shown in Figure 5 with the exception that quadrature electrode 26 and limiter electrode 29 are coupled together and to the junction of resistors 30 and 31, the remaining end-terminals of which are alternatively coupled to positive voltage $V_3$ and negative $V_6$ of the power supply (not shown).

The circuit shown in Figure 6 operates in a manner similar to the circuit of Figure 5, ignoring positive voltage $V_2$ and the contact and switching arm of relay 13 associated therewith.

The circuit shown in Figure 7 is identical to the circuit of Figure 5, with the exception that negative voltage $V_6$ and the contact and switching arm of relay 13 associated therewith are removed. In addition, the remaining end-terminals of resistors 28 and 31 are jointly coupled to negative voltage $V_5$.

The circuit shown in Figure 7 operates in a manner which is identical to the operation of the circuit shown in Figure 5, with the exception that voltage $V_6$ and the relay contact and switching arms associated therewith are not involved.

The circuit of Figure 8 is identical to the circuit shown in Figure 6, with the exception that voltage $V_6$ and the switching arm and relay contact associated therewith are removed. In addition, the remaining end-terminal of resistor 31 is coupled directly to negative voltage $V_5$.

The circuit shown in Figure 8 operates in a manner which is similar to the operation of the circuit shown in Figure 6, after ignoring voltage $V_6$ and the relay arm and contact associated therewith.

It is readily seen from the numerous embodiments explained above that the present invention adapts itself to systems which require one, two or even three positive and negative voltages, or any combination of the same. Embodiments of the present invention have been shown experimentally to be highly satisfactory and reliable, and also adjustable to any sensitivity which the system concerned requires. Both the embodiments explained in the present disclosure and in the appended claims are to be understood to include any future tube types which will prove to exhibit identical or similar characteristics to the 6BN6 type tube.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A load protection circuit including, in combination, a vacuum tube exhibiting a sharply rising, step-shaped transfer characteristic and having anode, cathode, limiter, accelerator, and quadrature electrodes, said accelerator electrode being maintained at a common reference potential; a relay having a solenoid with first and second end-terminals, a plurality of "energized condition" contacts, and a plurality of switching arms associated therewith adapted for coupling to a plurality of load circuits and normally closed when said vacuum tube is in its conductive state; first, second and third positive potential sources and first, second and third negative potential sources each being coupled to one of said relay contacts; said first end-terminal of said relay solenoid being coupled to said anode electrode of said vacuum tube; said second end-terminal of said relay solenoid being coupled to said first positive potential source; a first voltage divider circuit coupled between said common reference potential and said first negative potential source and consisting of first and second series-connected resistors the junction therebetween being coupled to said cathode electrode of said vacuum tube; a second voltage divider circuit coupled between said second positive potential source and said second negative potential source and consisting of third and fourth series-connected resistors the junction therebetween being coupled to said quadrature electrode of said vacuum tube; and a third voltage divider circuit coupled between said third positive potential source and said third negative potential source and consisting of fifth and sixth series-connected resistors the junction therebetween being coupled to said limiter electrode of said vacuum tube.

2. A load protection circuit including, in combination, a vacuum tube exhibiting a sharply rising, step-shaped transfer characteristic and having anode, cathode, limiter, accelerator and quadrature electrodes, said accelerator electrode being maintained at a common reference potential; a relay having a solenoid with first and second end-terminals, a plurality of "energized condition" contacts, and a plurality of switching arms associated therewith adapted for coupling to a plurality of load circuits and normally closed when said vacuum tube is in its conductive state; first and second positive potential sources and first, second and third negative potential sources each being coupled to one of said relay contacts; said first end-terminal of said relay solenoid being coupled to said anode electrode of said vacuum tube; said second end-terminal of said relay solenoid being maintained at said common reference potential; a first voltage divider circuit coupled between said common reference potential and said first negative potential source and consisting of first and second series-connected resistors the junction therebetween being coupled to said cathode electrode of said vacuum tube; a second voltage divider circuit coupled between said first positive potential source and said second negative potential source and consisting of third and fourth series-connected resistors the junction therebetween being coupled to said quadrature electrode of said vacuum tube; and a third voltage divider circuit coupled between said second positive potential source and said third negative potential source and consisting of fifth and sixth series-connected resistors the junction therebetween being coupled to said limiter electrode of said vacuum tube.

3. A load protection circuit including, in combination, a vacuum tube exhibiting a sharply rising, step-shaped transfer characteristic and having anode, cathode, limiter, accelerator and quadrature electrodes, said accelerator electrode being maintained at a common reference potential; a relay having a solenoid with first and second end-terminals, a plurality of "energized condition" contacts, and a plurality of switching arms associated therewith adapted for coupling to a plurality of load circuits and normally closed when said vacuum tube is in its conductive state; first, second and third positive potential sources and first and second negative potential sources each being coupled to one of said relay contacts; said first end-terminal of said relay solenoid being coupled to said anode electrode of said vacuum tube; said second end-terminal of said relay solenoid being coupled to said first positive potential source; a first voltage divider circuit coupled between said common reference potential and said first negative potential source and consisting of first and second series-connected resistors the junction therebetween being coupled to said cathode electrode of said vacuum tube; a second voltage divider circuit coupled between said second positive potential source and said second negative potential source and consisting of third and fourth series-connected resistors the junction therebetween being coupled to said quadrature electrode of said vacuum tube; and a third voltage divider circuit coupled between said third positive potential source and said second negative potential source and consisting of fifth and sixth series-connected resistors the junction therebetween being coupled to said quadrature electrode of said vacuum tube.

4. A load protection circuit including, in combination, a vacuum tube exhibiting a sharply rising, step-shaped transfer characteristic and having anode, cathode, limiter, accelerator and quadrature electrodes, said accelerator electrode being maintained at a common reference potential; a relay having a solenoid with first and second end-terminals, a plurality of "energized condition" contacts, and a plurality of switching arms associated therewith adapted for coupling to a plurality of load circuits and normally closed when said vacuum tube is in its conductive state; first and second positive potential sources and first and second negative potential sources each being coupled to one of said relay contacts; said first end-terminal of said relay solenoid being coupled to said anode electrode of said vacuum tube; said second end-terminal of said relay solenoid being maintained at said common reference potential; a first voltage divider circuit coupled between said common reference potential and said first negative potential source and consisting of first and second series-connected resistors the junction therebetween being coupled to said cathode electrode of said vacuum tube; a second voltage divider circuit coupled between said first positive potential source and said second negative potential source and consisting of third and fourth series-connected resistors the junction therebetween being coupled to said quadrature electrode of said vacuum tube; and a third voltage divider circuit coupled between said second positive potential source and said second negative potential source and consisting of fifth and sixth series-connected resistors the junction therebetween being coupled to said limiter electrode of said vacuum tube.

5. A load protection circuit including, in combination, a vacuum tube exhibiting a sharply rising, step-shaped transfer characteristic and having anode, cathode, limiter, accelerator and quadrature electrodes, said accelerator electrode being maintained at a common reference potential; a relay having a solenoid with first and second end-terminals, a plurality of "energized condition" contacts, and a plurality of switching arms associated therewith adapted for coupling to a plurality of load circuits and normally closed when said vacuum tube is in its conductive state; a positive potential source and first and second negative potential sources each being coupled to one of said relay contacts; said first end-terminal of said relay solenoid being coupled to said anode electrode of said vacuum tube; said second end-terminal of said relay solenoid being maintained at a common reference potential; a first voltage divider circuit coupled between said common reference potential and said first negative potential source and consisting of first and second series-connected resistors the junction therebetween being coupled to said cathode electrode of said vacuum tube; and a second voltage divider circuit coupled between said positive potential source and said second negative potential source and consisting of third and fourth series-connected resistors the junction therebetween being coupled to said quadrature and limiter electrodes of said vacuum tube.

6. A load protection circuit including, in combination, a vacuum tube exhibiting a sharply rising, step-shaped transfer characteristic and having anode, cathode, limiter, accelerator and quadrature electrodes, said accelerator electrode being maintained at a common reference potential; a relay having a solenoid with first and second end-terminals, a plurality of "energized condition" contacts, and a plurality of switching arms associated therewith adapted for coupling to a plurality of load circuits and normally closed when said vacuum tube is in its conductive state; first and second positive potential sources and a negative potential source each being coupled to one of said relay contacts; said first end-terminal of said relay solenoid being coupled to said anode electrode of said vacuum tube; said second end-terminal of said relay solenoid being maintained at a common reference potential; a first voltage divider circuit coupled between said common reference potential and said negative potential source and consisting of first and second series-connected resistors the junction therebetween being coupled to said cathode electrode of said vacuum tube; a second voltage divider circuit coupled between said first positive potential source and said negative potential source and consisting of third and fourth series-connected resistors the junction therebetween being coupled to said quadrature electrode of said vacuum tube; and a third voltage divider circuit coupled between said second positive potential source and said negative potential source and consisting of fifth and sixth series-connected resistors the junction therebetween being coupled to said limiter electrode of said vacuum tube.

7. A load protection circuit including, in combination, a vacuum tube exhibiting a sharply rising, step-shaped transfer characteristic and having anode, cathode, limiter, accelerator and quadrature electrodes, said accelerator electrode being maintained at a common reference potential; a relay having a solenoid with first and second end-terminals, a plurality of "energized condition" contacts, and a plurality of switching arms associated therewith adapted for coupling to a plurality of load circuits and normally closed when said vacuum tube is in its conductive state; a positive potential source and a negative potential source each being coupled to one of said relay contacts; said first end-terminal of said relay solenoid being coupled to said anode electrode of said vacuum tube; said second end-terminal of said relay solenoid being maintained at a common reference potential; a first voltage divider circuit coupled between said common reference potential and said negative potential source and consisting of first and second series-connected resistors the junction therebetween being coupled to said cathode electrode of said vacuum tube; a second voltage divider circuit coupled between said positive potential source and said negative potential source and consisting of third and fourth series-connected resistors the junction therebetween being coupled to said quadrature and limiter electrodes of said vacuum tube.

8. A load protection circuit including, in combination, a vacuum tube exhibiting a sharply rising, step-shaped transfer characteristic and having anode, cathode, limiter, accelerator and quadrature electrodes, said accelerator electrode being coupled to a common reference potential source; a relay having a solenoid, a plurality of "energized condition" contacts, and a plurality of switching arms associated therewith adapted for coupling to a plurality of load circuits and normally closed when said vacuum tube is in its conductive state; a plurality of potential sources each coupled to one of said relay contacts; said relay solenoid being coupled to said anode electrode of said vacuum tube and responsive to the anode current thereof; said cathode electrode of said vacuum tube being coupled to one of said potential sources; and a voltage divider network intercoupling said limiter and quadrature electrodes with said plurality of potential sources.

References Cited in the file of this patent

UNITED STATES PATENTS

| | | |
|---|---|---|
| 2,369,589 | Maddock | Feb. 13, 1945 |
| 2,548,818 | Rambo | Apr. 10, 1951 |